No. 651,598. Patented June 12, 1900.
P. FITZGERALD.
AXLE AND BODY CONNECTION FOR DROP DOWN VEHICLES AND SPRINGS THEREFOR.
(Application filed Oct. 9, 1899.)

(No Model.) 3 Sheets—Sheet 1.

Witnesses:
J. W. Garfield
H. S. Clemons

Inventor:
Patrick Fitzgerald
by Chapin
Attorneys

THE NORRIS PETERS CO., PHOTO-LITHO., WASHINGTON, D. C.

No. 651,598. Patented June 12, 1900.
P. FITZGERALD.
AXLE AND BODY CONNECTION FOR DROP DOWN VEHICLES AND SPRINGS THEREFOR.
(Application filed Oct. 9, 1899.)
(No Model.) 3 Sheets—Sheet 2.
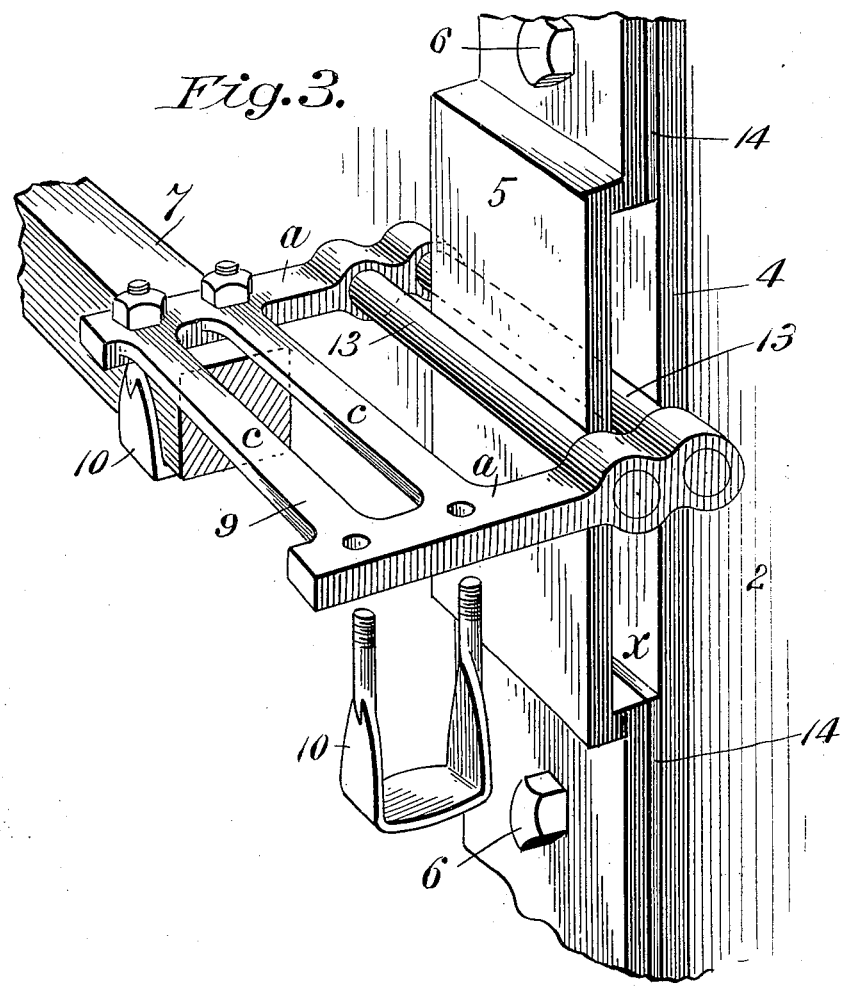
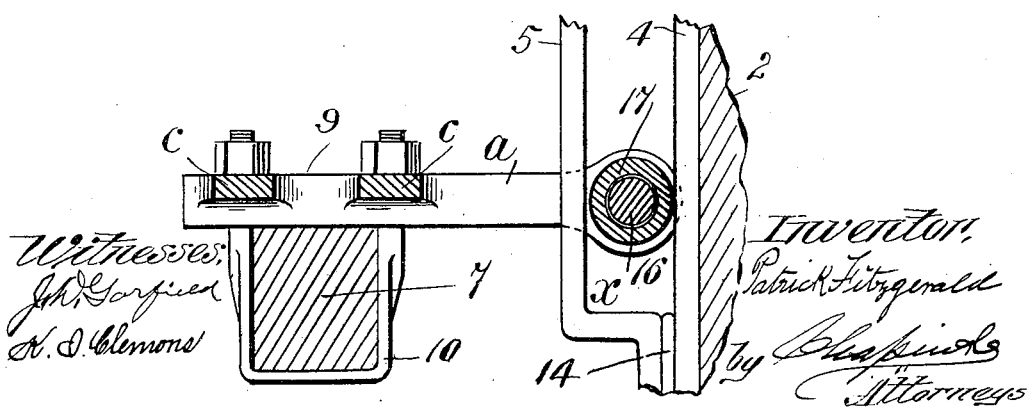

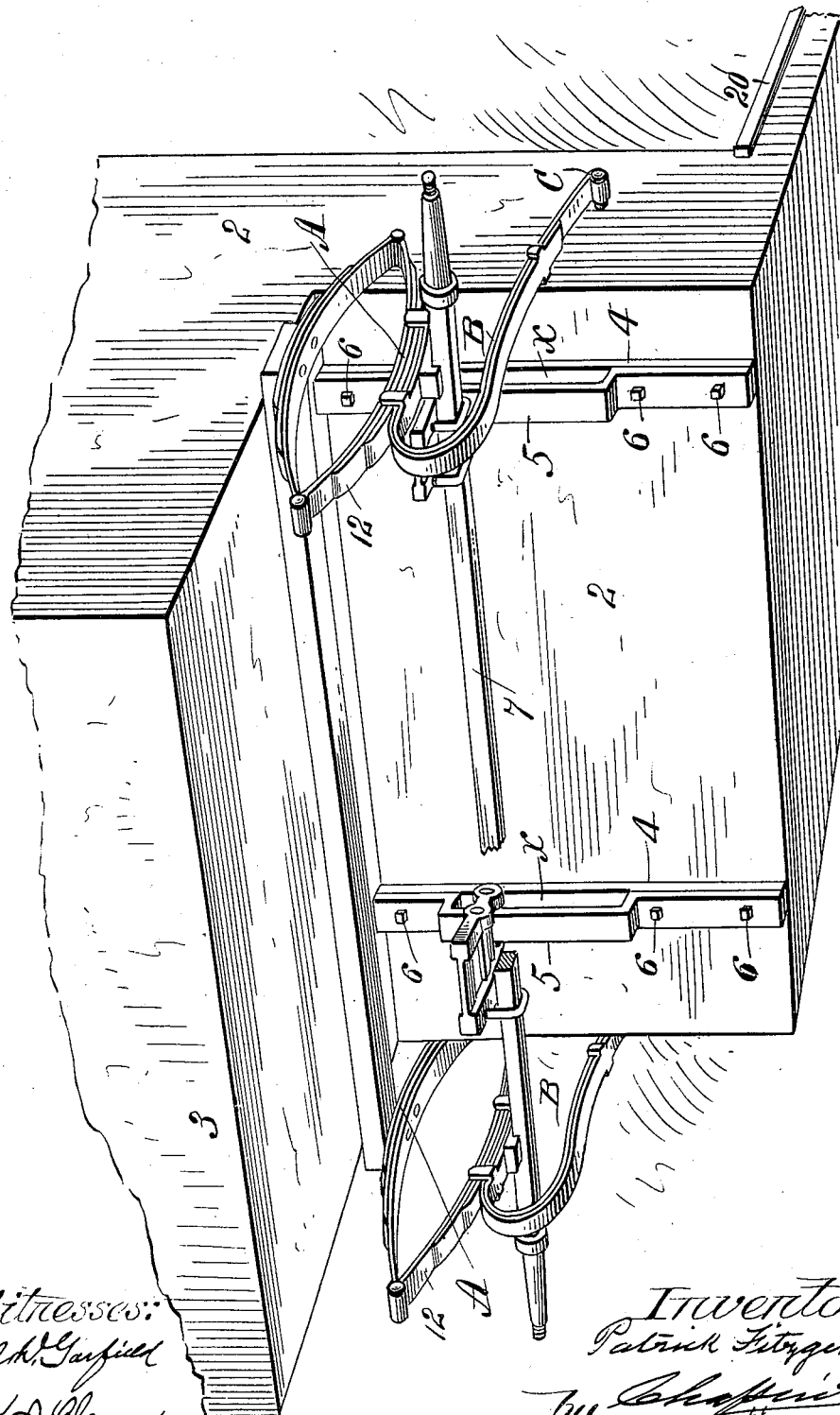

UNITED STATES PATENT OFFICE.

PATRICK FITZGERALD, OF SPRINGFIELD, MASSACHUSETTS.

AXLE AND BODY CONNECTION FOR DROP-DOWN VEHICLES AND SPRINGS THEREFOR.

SPECIFICATION forming part of Letters Patent No. 651,598, dated June 12, 1900.

Application filed October 9, 1899. Serial No. 733,013. (No model.)

*To all whom it may concern:*

Be it known that I, PATRICK FITZGERALD, a citizen of the United States, residing at Springfield, in the county of Hampden and State of Massachusetts, have invented new and useful Improvements in Axle and Body Connections for Drop-Down Vehicles and in Springs Therefor, of which the following is a specification.

This invention relates to axle and body connecting devices for vehicles and in springs therefor, the object being to provide for that class thereof ordinarily termed "drop-down" wagons improved devices connecting the axles thereof with the body of the wagon, whereby ample support is had for holding the axle in place under ordinary circumstances of road use, but affording all desired freedom of the body for easy vertical movements and an improved spring for this class of vehicles; and the invention consists in the peculiar construction and arrangement of the body and axle connecting devices and the springs therefor, all as hereinafter fully described, and more particularly pointed out in the claims.

Figure 1:
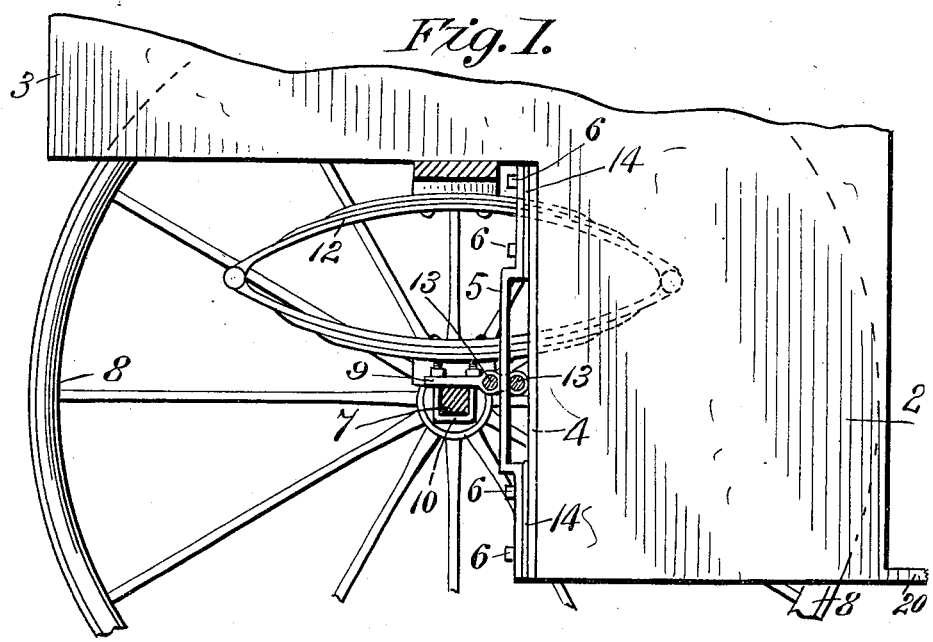
Figure 2:
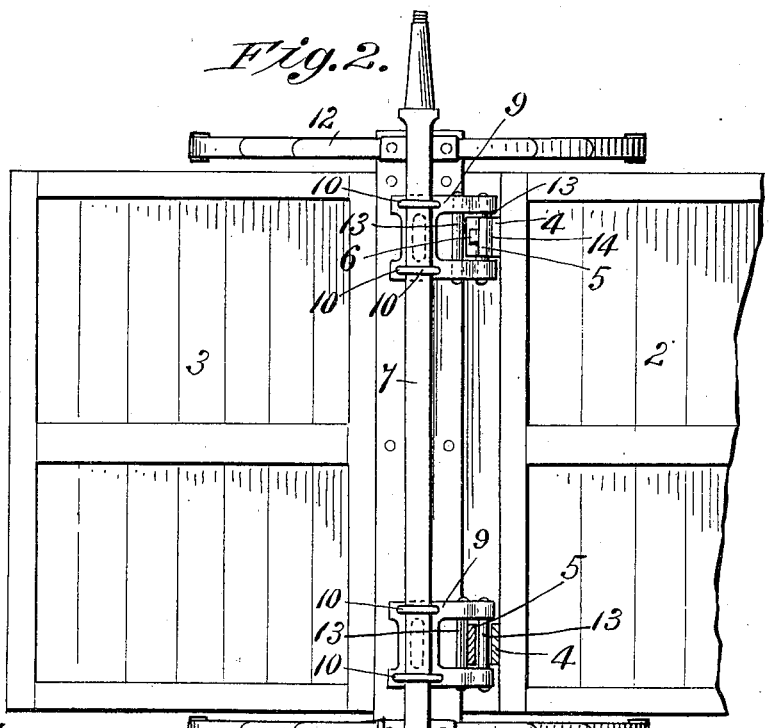

In the drawings forming part of this specification, Figure 1 is a side elevation of portions of the body of a drop-down-wagon body having my improved body and axle connections applied thereto, the axle and contiguous parts being shown in section and a part of a wheel being shown thereon. Fig. 2 is a bottom plan view of a part of said body, illustrating the axle and springs connected thereto, one of the body and axle connections being shown in section. Fig. 3 is an enlarged perspective view of a part of the axle, of the devices applied to the wagon-body, and of those intermediate of the latter and of the axle. Fig. 4 is partly a sectional and partly an edge view illustrating a slightly-modified construction of the device uniting the axle with the wagon-body. Fig. 5 is a perspective view of portions of the body of the wagon and of the axle and body connections and of the preferred spring construction for vehicles of the class herein described.

Referring to the drawings, 2 indicates the drop-down central part of the wagon-body, and 3 the rear portion thereof, extending over the axle, on which one of the seats of the vehicle is ordinarily located. A portion of the floor of the body of the wagon between the said drop-down part 2 and the ordinarily corresponding front part of the body is indicated by 20 in Fig. 1. The parts of each of the two axle and body uniting devices which are applied and secured to said body consist of a metal bar or strap 4, secured against the rear vertical wall of said drop-down portion 2 and of an outer bar or strap 5, both secured against said body by the bolts 6. The central portion of said bar 5 is offset, as shown, thereby leaving a clear space $x$ between the two, and thus providing by said bars, arranged as aforesaid, one part 5 for clear engagement with the below-described axle-yoke, whereby the body and axle, one or the other, may have free vertical movements while so connected, and both of said bars holding the axle firmly in line with the part of the body to which they are attached.

The axle 7 is adapted to receive ordinary carriage-wheels 8. The springs shown in Fig. 5 illustrate the preferred construction for vehicles of this class; but ordinary elliptic springs 12, such as are shown in Figs. 1 and 2, may be employed and be connected between the axle and body, as there shown. The said axle extends horizontally back of and near to the rear wall of said drop-down part 2 of the body, as shown in Fig. 2. The said spring construction of Fig. 5 comprises for each spring, in addition to the usual elliptic part A, an auxiliary spring B, consisting, preferably, of two leaves bent or doubled about midway of their ends to bring the extremities or arms thereof substantially opposite each other, but one arm being longer than the other for a purpose below described. The shorter arm of the said auxiliary spring is firmly secured to the lower bow of the elliptic spring 12, as shown, and to the top of the axle 7 thereunder, and the longer arm thereof passes first rearwardly and then downwardly and under the axle in a forwardly and downwardly inclined direction by the side of said body portion 2, as shown in said last-named figure, and the extremity of the arm is pivotally attached to said body side by a bolt C. In this spring construction the said auxiliary spring-arm B, connected by one extremity over and to the axle 7 and by its opposite extremity to the body of the vehicle, as described, forms a powerful aid in supporting the axle against any forces which may tend to drive it suddenly backward or forward while moving on a road; and it furthermore provides a similar strengthening element for the elliptic spring 12, and the pressure of said arm B between the body 2 and the axle tends to induce a much easier spring movement between the body and the axle than would otherwise result. Also a particular advantage which said auxiliary spring-arm has in a vehicle having the axle and body connections herein shown is that it greatly relieves the backward strain between the axle and the bars 5 5, which without said spring-arms would be entirely upon the yokes 9. The means of connection between said axle and the last-named body part consists of two metallic yokes 9, the construction of which is clearly shown in Fig. 3 and is illustrated in Figs. 1 and 2 in operative relation to the axle and the wagon-body, and is as follows: The frame of said yokes comprises the side bars $a$ $a$ and the transverse side uniting-bars $c$ $c$ and is preferably made integrally of suitable cast metal, as malleable iron, and the said side bars are suitably perforated to receive two bars 13 13, preferably round, in fixed positions, which are sufficiently separated to receive therebetween the said offset central portion of the bar 5, as shown. This latter-named bar has properly-smoothed surfaces, and when more or less lubricated the vertical motion of the bars thereagainst while the wagon is running is free and easy. Said yoke is rigidly secured to the said axle by the usual clips 10, which engage the latter and are attached to said yokes by the usual nuts, as shown.

In order to so cushion the main axle-supporting parts, which are attached each to the other and to the wagon-body, that a practically-noiseless construction is produced, strips of rubber 14 are interposed between said straps 4 and 5 and the wagon-body.

The operation of the above-described axle and body connections is as follows: The normal position of said axle connections relative to the strap 5, as shown in Fig. 1, is substantially such as they would be brought to under a common load—that is, the yoke 9 is about midway of the opposite ends of the opening or space between said straps 4 and 5, so that such vertical movement as the wagon-body may assume would be free, and the axle, by the engagement of the bars 13 between said straps, is firmly supported against any backward or forward movements which might arise from the roughness of the road. Hence it will be seen that through the simple above-described devices all requisite free movements of the body and axle are provided for and that in every case the strain upon the body arising from any uncommon obstruction that the wheels may encounter is substantially in a direct line between the axle and body. The said modification of axle and body connections illustrated in Fig. 4 provides for connecting the yoke 9 with the body by a single bar 16, having a friction-roll 17 thereon, which roll is of a diameter somewhat less than the width of the space between the inner opposite faces of the straps 4 and 5, to the end that when the axle on which said yoke may be fixed is carried toward and from the body said roll shall bear alternately against said straps 4 and 5 and have rolling movements corresponding with such vertical movements as the body may have.

Having thus described my invention, what I claim, and desire to secure by Letters Patent of the United States, is—

1. Axle and body connections for vehicles comprising one or more yokes 9, rigidly secured on the axle, each yoke comprising a metallic frame composed of two side bars $a$, $a$ united at one end by a cross-bar and having two separated bars 13, 13, extending across the free end thereof, combined with a vertical yoke-engaging bar 5 for each yoke extending freely between said separated bars and secured by their extremities to the vertical end of the vehicle-body, substantially as described.

2. Springs for each end of the rear axle of a vehicle of the class described, comprising an elliptic spring 12, intermediate of the axle 7, and the rearwardly-extending part 3 of the vehicle-body, and the two-armed spring B having its shorter arm secured between said spring 12 and the axle, and extending from thence rearwardly in curved form and having the second arm extending forwardly, and pivotally attached to the outer side of the central drop-down part of said body, substantially as set forth.

PATRICK FITZGERALD.

Witnesses:
H. A. CHAPIN,
K. I. CLEMONS.